(12) United States Patent
Radhakrishnan et al.

(10) Patent No.: US 7,713,319 B2
(45) Date of Patent: May 11, 2010

(54) GLYCOL RECYCLE SYSTEM

(75) Inventors: Rakesh Radhakrishnan, Vernon, CT (US); Steven J. Moss, Rockford, IL (US); Per-Anders K. Lof, Arlington, MA (US); Michael K. Sahm, Avon, CT (US); Joseph J. Sangiovanni, West Suffield, CT (US); Thomas Henry Vanderspurt, Glastonbury, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 725 days.

(21) Appl. No.: 11/505,079

(22) Filed: Aug. 16, 2006

(65) Prior Publication Data
US 2008/0044325 A1 Feb. 21, 2008

(51) Int. Cl.
*C01B 3/32* (2006.01)

(52) U.S. Cl. .......... 48/198.7; 422/190; 48/61; 48/211; 202/163; 202/185.1; 95/46

(58) Field of Classification Search ........... 422/190; 48/76, 204, 198.7, 61, 211; 210/500.27, 210/640; 95/46; 202/163, 185.1, 197; 96/4, 96/361
See application file for complete search history.

(56) References Cited

U.S. PATENT DOCUMENTS

| | | | | |
|---|---|---|---|---|
| 4,225,394 A | * | 9/1980 | Cox et al. | 203/37 |
| 5,104,068 A | | 4/1992 | Krilla et al. | |
| 5,194,159 A | * | 3/1993 | George et al. | 210/654 |
| 5,236,558 A | * | 8/1993 | Buyalos et al. | 203/18 |
| 5,269,933 A | * | 12/1993 | Jehle et al. | 210/640 |
| 5,411,668 A | * | 5/1995 | Pollmann et al. | 210/638 |
| 5,462,655 A | | 10/1995 | Ladd et al. | |
| 5,552,023 A | * | 9/1996 | Zhou | 203/18 |
| 5,922,198 A | * | 7/1999 | Kelly et al. | 210/241 |
| 5,932,105 A | * | 8/1999 | Kelly | 210/651 |
| 5,997,594 A | | 12/1999 | Edlund et al. | |
| 6,221,117 B1 | * | 4/2001 | Edlund et al. | 48/76 |
| 6,789,288 B2 | * | 9/2004 | Wijmans et al. | 15/188 |
| 2004/0079491 A1 | * | 4/2004 | Harris et al. | 159/16.1 |

OTHER PUBLICATIONS

Search Report EP070253239.

* cited by examiner

*Primary Examiner*—N. Bhat
(74) *Attorney, Agent, or Firm*—Carlson, Gaskey & Olds PC

(57) ABSTRACT

A fluid recycling system includes a separator for physically separating glycol from at least a portion of other substances mixed with the glycol to produce a first effluent stream having separated glycol and a second effluent stream having the other substances and residual glycol. A catalytic reactor receives the second effluent stream and chemically reacts the other substances and residual glycol to produce a hydrogen stream and a remainder stream.

23 Claims, 2 Drawing Sheets

GLYCOL RECYCLE SYSTEM

BACKGROUND OF THE INVENTION

This invention relates to recycling and, more particularly, to recycling glycol that is mixed with various other types of substances.

Glycol is well known and used in a variety of different applications. For example, glycol has a relatively low freezing point (~65° C.), which makes it attractive for use as an anti-freezing fluid in vehicles and other systems. One particular use of anti-freezing fluids occurs at airports for de-icing aircrafts before take-off. Typically, an aircraft is sprayed with a de-icing fluid that contains glycol to eliminate ice accumulation and prevent freezing of water on the aircraft. Spent glycol is then either released into the environment or collected within a collection system. Due to environmental concerns, the glycol is preferably collected rather than released.

Typically, the spent glycol is polluted with water, fumes from the aircraft, solid debris in the collection system such as leaves, grass, etc., and other substances. The spent glycol is not reused in this polluted state. Typically, the airport pays a fee to dispose of it. However, some airports employ a system to recover a portion of the glycol. For example, the spent glycol is collected in a reservoir wherein the undesired substances, which are generally lighter than the glycol, float on top of the glycol. The top is then ignited to burn off the undesired substances (often referred to as "flashing") to produce purer glycol. One drawback to flashing is that it is difficult to obtain highly pure glycol. Other recovery systems include aerobic digesters and distillation columns, however, these systems are prone to leaking, employ relatively expensive equipment, and can be relatively expensive to operate. Additionally, even if the glycol is recovered using any of the above systems, no use is made of the substances that are mixed with the glycol.

Accordingly, there is a need for a recycle system for recovering a spent substance such as glycol and also recovering or using the other substances mixed with the spent substance. This invention addresses those needs while avoiding the shortcomings and drawbacks of the prior art.

SUMMARY OF THE INVENTION

An example fluid recycling system includes a separator for physically separating glycol from at least a portion of other substances mixed with the glycol. The separator discharges a first effluent stream having glycol and a second effluent stream having the other substances and residual glycol. A catalytic reactor receives the second effluent stream and chemically reacts the other substances and residual glycol to produce a hydrogen stream and a remainder stream.

In another aspect, the fluid recycling system includes a separator for physically separating glycol from other substances mixed with the glycol. The separator discharges a first effluent stream having glycol and a second effluent stream having undesired substances and residual glycol. A catalytic reactor having a heating chamber and a catalyst within the heating chamber receives the second effluent stream and chemically reacts the other substances and residual glycol to produce a hydrogen stream and a remainder stream. A thermal distiller between the separator and the catalytic reactor receives the second effluent stream and removes at least a portion of the residual glycol from the second effluent stream. Optionally excess water from the second effluent stream is removed before or after the thermal distiller by means of a water selective membrane. A burner receives the remainder stream from the catalytic reactor and combusts the remainder stream to produce usable heat.

An example method of recycling includes the steps of separating glycol from other substances mixed with the glycol to produce a first effluent stream having glycol and a second effluent stream having the other substances and residual glycol. The other substances and residual glycol are then chemically reacted with a catalyst to produce a hydrogen stream and a remainder stream.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
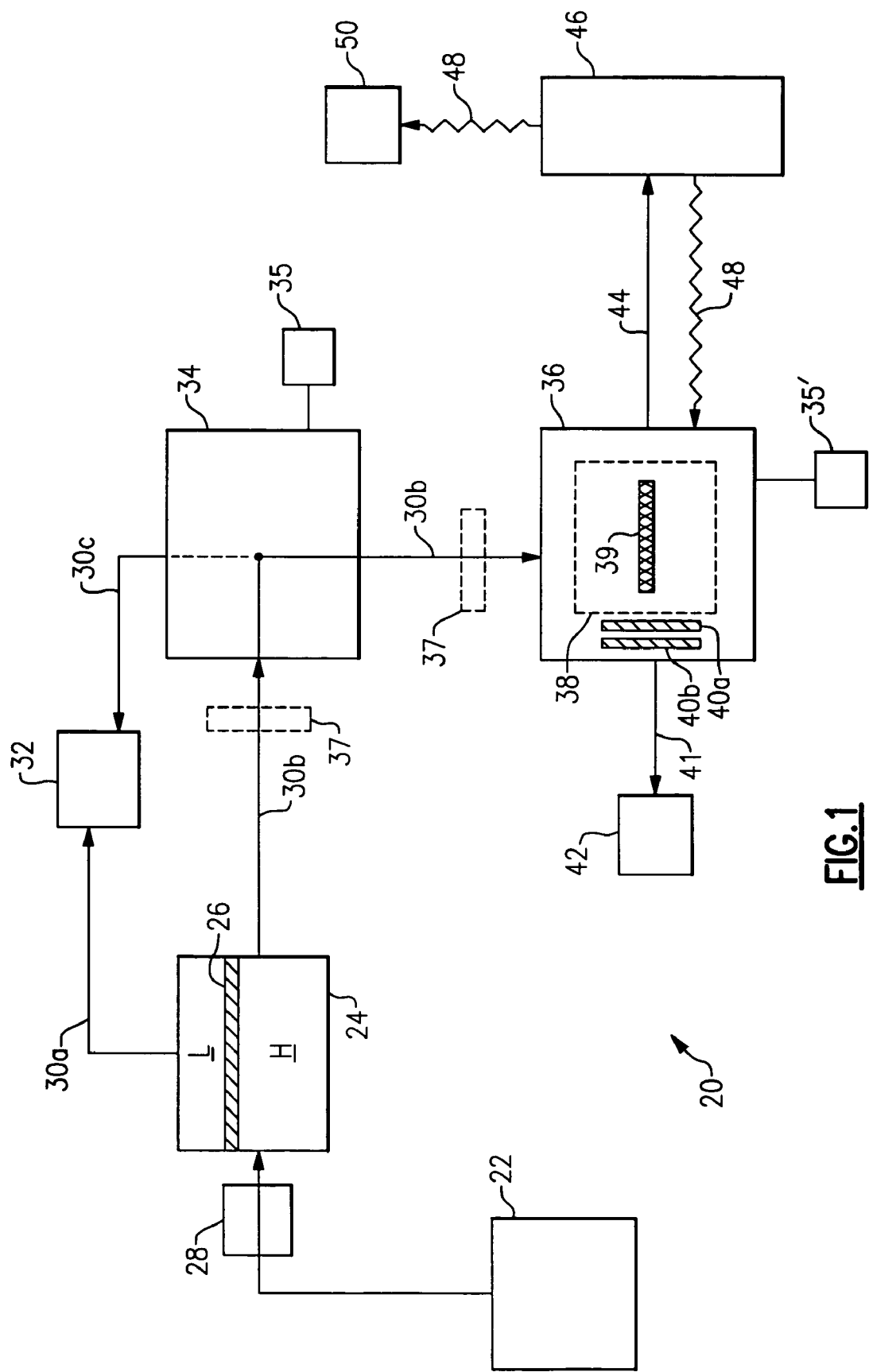
FIG. 1 illustrates an example recycling system for recycling a spent substance such as glycol.

FIG. 1 illustrates selected portions of an example recycling system 20 for recycling spent glycol (e.g., ethylene glycol, propylene glycol, etc.). As will be described, the recycling system 20 receives spent glycol that is mixed with other substances, such as water and biomaterials, and separates the glycol from the other substances. The recycling system 20 provides numerous benefits, including recovering relatively pure glycol and using the other substances to produce hydrogen fuel and useful heat.

In the illustrated example, the recycling system 20 includes a reservoir 22 for storing spent glycol that is mixed with the other substances. In one example, the reservoir 22 is an airport reservoir associated with an aircraft de-icing area of an airport. For example, aircrafts are sprayed in the de-icing area with a de-icing fluid that contains glycol. The spent de-icing fluid is collected through a drainage system or the like and stored in the reservoir 22. During the de-icing process, the de-icing fluid may mix with solid debris (leaves, grass, etc.), water, or other substances in the de-icing area or within the drainage system.

A separator 24 receives the spent de-icing fluid (spent glycol) from the reservoir 22 and separates glycol from water and other compounds. For example, the separator 24 uses (but is not limited to) membrane filtration, reverse osmosis, etc. or a combination thereof to separate the glycol.

In the disclosed example, the separator 24 includes a membrane 26 that separates a high pressure side, H, from a low pressure side, L. In the illustrated example, a heater 28 associated with the separator 24 heats the spent glycol to a temperature that is suitable to vaporize the glycol. The vaporized glycol and other substances enter the separator 24 on the high pressure side H. In this example, the low pressure side L contains a lower concentration of glycol than the high pressure side H with the vaporized glycol. The difference in glycol partial pressure causes the vaporized glycol to diffuse from the high pressure side H through the membrane 26 to the low pressure side L, thereby physically separating at least some of the glycol from the other substances. In one example, separated glycol is relatively pure (i.e. 100% glycol). In other examples, a portion of the other substances also diffuses across the membrane such that the separated glycol is less than 100% pure.

Alternatively, the heater 28 is not used or only heats the glycol and other substances to a temperature below the vaporization temperature of the glycol. In this example, high pressure on the high pressure side H drives the glycol through the membrane 26 to separate it from the undesired substances (reverse osmosis). Thus, the separator 24 can be designed to operate as a vapor filter under the principles of partial pressure or as a liquid separator under the principles of reverse osmosis.

The separator 24 discharges the separated glycol in a first effluent stream 30a and the remaining material in a second effluent stream 30b. For example, the second effluent stream 30b includes water, solid biomaterials, and residual glycol. In this example, the first effluent stream 30a flows to a storage reservoir 32 and the second effluent stream 30b flows to a thermal distiller 34.

The thermal distiller 34 removes at least a portion of the residual glycol from the second effluent stream 30b using heat. In the disclosed example, a renewable energy source 35, such as a solar thermal energy source, wind energy source coupled to an electric heater or biomass combustion energy source, generates the heat. Alternatively, a conventional non-renewable energy source is used. The thermal distiller 34 employs fractionation to separate the residual glycol from the second effluent stream 30b and discharges the separated glycol in a third effluent stream 30c to the storage reservoir. The thermal distiller 34 thereby provides the advantage of recovering a greater amount of glycol. The second effluent stream 30b, which includes the other substances, water and some residual glycol that was not removed by the thermal distiller 34, continues on to a catalytic reactor 36. In this example, the storage reservoir 32 and effluent streams 30a and 30c contain a glycol mixture that is approximately equal to the solution composition commonly used for aircraft deicing fluids.

Optionally a water selective membrane device 37 (shown in phantom) is located within the second effluent stream 30b either before or after the thermal distiller 34 to remove excess water from the second effluent stream 30b. This provides the benefit of controlling the amount of water in the second effluent stream 30b going to the catalytic reactor 36.

The catalytic reactor 36 includes a heating chamber 38 having a catalyst 39 that, with heat, chemically reacts the other substances and any remaining residual glycol. In this example, similar to the thermal distiller, a renewable energy source 35', such as a solar thermal energy source, wind energy source coupled to an electric heater or biomass combustion energy source, generates the heat. Alternatively, a conventional non-renewable energy source is used.

In one example, the catalyst 39 includes a heterogeneous catalyst, such as platinum, iridium, palladium, rhodium, ruthenium, cobalt, nickel, gold or mixtures thereof and a support that is effectively insoluble in the liquid glycol containing liquid. The catalyst 39 may also contain activity or selectivity modifiers like tin. One of ordinary skill in the art who has the benefit of this disclosure will recognize other types of catalysts that can be used to suit their particular needs. The catalyst 39 and heat cause the reaction of the residual glycol and other substances with water to form a mixture of hydrogen, carbon dioxide, and carbon monoxide, along with, depending on the catalyst 39 chosen, the reaction conditions, and the impurities present, light alkanes such as methane. Depending on the composition of the other substances in the spent glycol, there may also be other types of molecules in the mixture.

Optionally, the catalytic reactor 36 includes first and second separation membranes 40a and 40b for facilitating separation of the mixture of hydrogen, carbon monoxide, and carbon dioxide. The first separation membrane 40a is a membrane that is suitable for separating hydrogen out of the mixture and the optional second membrane 40b is suitable for separating carbon dioxide out of the mixture. Given this description, one of ordinary skill in the art will be able to select suitable membranes for separating the mixture in a desirable manner. Thus, the membranes 40a and 40b provide the benefit of producing relatively pure hydrogen that can be stored or used to power vehicles. The catalytic reactor 36 discharges the hydrogen in a hydrogen stream 41 into a storage reservoir 42 and discharges a remainder stream 44 into a burner 46.

In the disclosed example, the burner 46 combusts the remainder stream 44 to produce heat 48. In one example, the burner 46 discharges the heat 48 to the catalytic reactor 36, a device 50 that converts the heat to electricity (such as a thermoelectric generator, Rankine engine, Stirling engine etc.) and/or cooling (such as an absorption chiller, adsorption chiller etc.) and/or heating (such as a heat exchanger). The heat 48 discharged to the catalytic reactor 36 facilitates chemical reaction between the catalyst 39, the other substances, and residual glycol in the second effluent stream 30b. In one example, the thermoelectric generator or a Rankine engine or a Stirling engine uses the heat 48 to generate electricity. In another example, a thermally driven cooling system such as an absorption chiller, adsorption chiller, or desiccant cooler converts the residual thermal energy to useful cooling. In yet another example, the heat exchanger uses the heat 48 to change the temperature of a heat transfer fluid and this medium can be used to provide supplemental process heat as needed.

Figure 2:
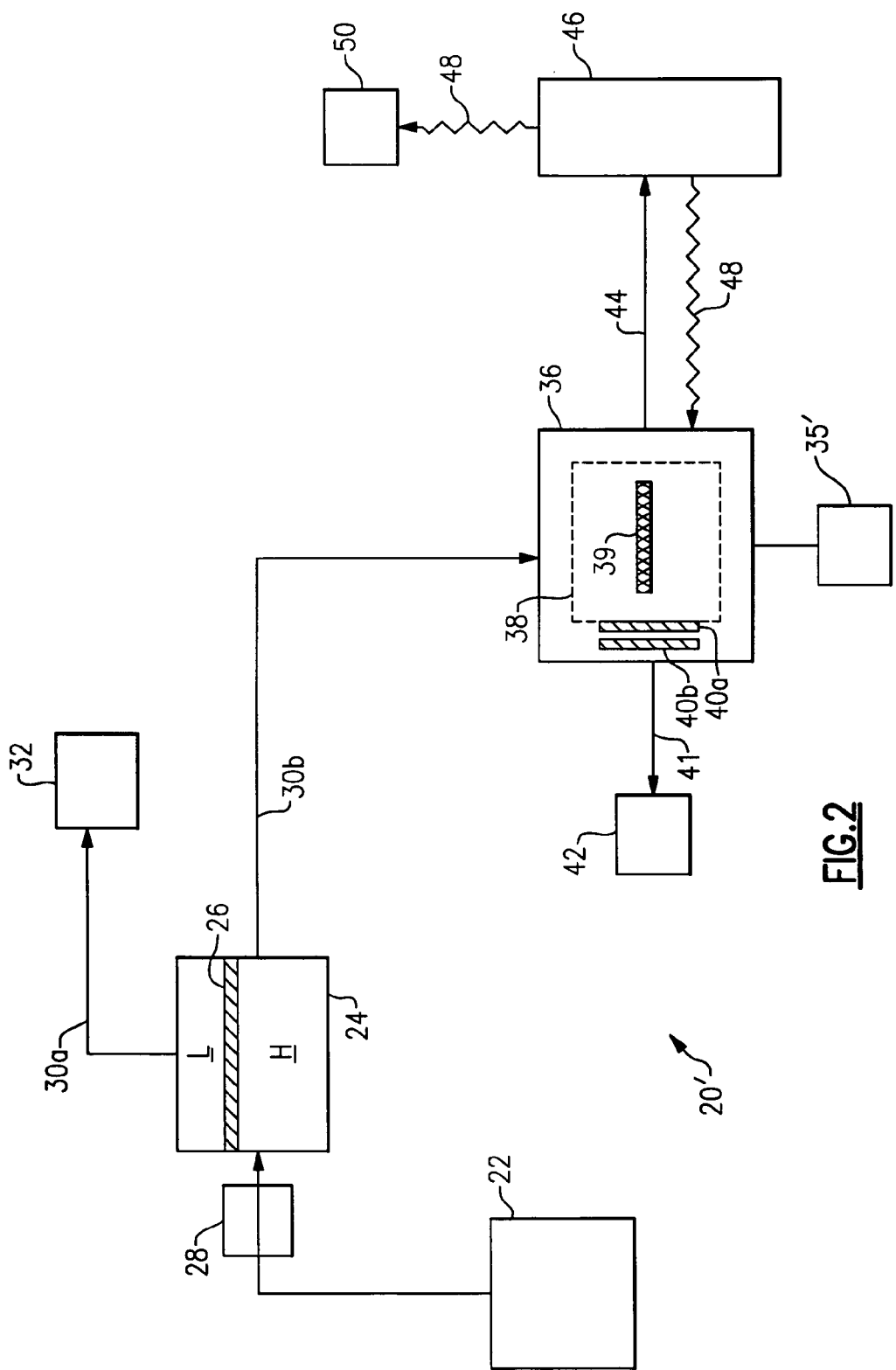
FIG. 2 illustrates a modified example recycling system for recycling a spent substance.

FIG. 2 illustrates a modified embodiment of a recycling system 20'. In this example, like reference numbers are used to describe like components. The recycling system 20' is similar to the recycling system 20 shown in FIG. 1 except that the recycling system 20' does not include the thermal distiller 34. In this embodiment, the second effluent stream 30b flows directly into the catalytic reactor 36 without removal of any of the residual glycol. Thus, any residual glycol in the second effluent stream 30b is converted to hydrogen and heat instead of being separated by the thermal distiller 34 as in the previous embodiment. The recycling system 20' thereby provides the benefit of recovering glycol, producing hydrogen and usable heat as in the first example, but without fiscal expenses associated with the thermal distiller 34.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A fluid recycling system comprising:
    a separator for physically separating glycol from at least a portion of other substances mixed with the glycol;
    a first effluent stream having separated, purified glycol;
    a second effluent stream having the other substances and residual glycol; and
    a catalytic reactor connected with the second effluent stream and chemically reacting the other substances and residual glycol to produce a hydrogen stream and a remainder stream.

2. The fluid recycling system as recited in claim 1, further comprising a thermal distiller between the separator and the catalytic reactor, the thermal distiller receiving the second effluent stream and removing at least a portion of the residual glycol from the second effluent stream.

3. The fluid recycling system as recited in claim 2, further comprising a renewable energy source selected from a group consisting of a solar thermal energy source, wind energy source coupled to an electric heater, biomass combustion energy source, and combinations thereof to provide heat to at least one of the thermal distiller or the catalytic reactor.

4. The fluid recycling system as recited in claim 2, further comprising a water selective membrane device adjacent the thermal distiller for removing at least a portion of the other substances from the second effluent stream.

5. The fluid recycling system as recited in claim 1, wherein the separator includes a membrane.

6. The fluid recycling system as recited in claim 5, wherein the separator includes a low pressure side and a high pressure side separated by the membrane such that the glycol moves through the membrane from the high pressure side to the low pressure side to separate the glycol from the other substances.

7. The fluid recycling system as recited in claim 6, further comprising a heater to heat and vaporize at least the glycol such that the vaporized glycol moves through the membrane from the high pressure side to the low pressure side.

8. The fluid recycling system as recited in claim 1, wherein the catalytic reactor includes a heating chamber and a heterogeneous catalyst within the heating chamber.

9. The fluid recycling system as recited in claim 1, further comprising a burner for receiving the remainder stream from the catalytic reactor and combusting the remainder stream to produce heat.

10. The fluid recycling system as recited in claim 9, further comprising a heat exchanger for receiving the heat from the burner.

11. The fluid recycling system as recited in claim 9, further comprising a thermoelectric power generator for receiving the heat from the burner.

12. The fluid recycling system as recited in claim 9, further comprising a device selected from a group consisting of a Rankine engine, a Stirling engine, an absorption chiller, an adsorption chiller, a desiccant cooler, and combinations thereof operatively connected with the burner for receiving the heat from the burner.

13. The fluid recycling system as recited in claim 1, further comprising a storage reservoir for storing hydrogen from the hydrogen stream.

14. The fluid recycling system as recited in claim 1, further comprising an airport glycol collection reservoir for supplying glycol mixed with the other substances to the separator.

15. A fluid recycling system comprising:
  a separator having a membrane for physically separating glycol from other substances mixed with the glycol;
  a first effluent stream having separated, purified glycol;
  a second effluent stream having the other substances and residual glycol;
  a catalytic reactor connected with the second effluent stream and having a heating chamber and a catalyst within the heating chamber for chemically reacting the other substances and residual glycol to produce a hydrogen stream and a remainder stream;
  a thermal distiller between the separator and the catalytic reactor for receiving the second effluent stream and removing at least a portion of the residual glycol from the second effluent stream; and
  a burner for receiving the remainder stream from the catalytic reactor and combusting the remainder stream to produce heat.

16. The fluid recycling system as recited in claim 15 further comprising a heat exchanger for receiving the heat from the burner, and a heater associated with the separator to heat and vaporize at least the glycol such that the vaporized glycol moves through the membrane from a high pressure side to a low pressure side.

17. A method of recycling, comprising the steps of:
  (a) separating glycol from other substances mixed with the glycol using a separator to produce a first effluent stream having separated, purified glycol and a second effluent stream having the other substances and residual glycol; and
  (b) chemically reacting the undesired substances and residual glycol of the second effluent stream in a catalytic reactor to produce a hydrogen stream and a remainder stream.

18. The method as recited in claim 17, including the step of thermally distilling the second effluent stream to remove at least a portion of the residual glycol.

19. The method as recited in claim 17, wherein step (a) includes producing a high pressure on one side of a membrane to move the glycol through the membrane to separate the glycol from at least a portion of the other substances.

20. The method as recited in claim 19, including heating and vaporizing at least the glycol.

21. The method as recited in claim 17, including the step of combusting the remainder stream to produce heat.

22. The method as recited in claim 21, including the step of changing the temperature of a fluid with the heat.

23. The method as recited in claim 21, including the step of generating electricity using the heat.

* * * * *

UNITED STATES PATENT AND TRADEMARK OFFICE
CERTIFICATE OF CORRECTION

PATENT NO. : 7,713,319 B2
APPLICATION NO. : 11/505079
DATED : May 11, 2010
INVENTOR(S) : Radhakrishnan et al.

It is certified that error appears in the above-identified patent and that said Letters Patent is hereby corrected as shown below:

On the Title page
The "Assignee" should read as follows.

Item (73) Assignee:   Hamilton Sundstrand Corporation, Windsor Locks, CT (US)

Signed and Sealed this

Twenty-seventh Day of July, 2010

David J. Kappos
*Director of the United States Patent and Trademark Office*